United States Patent [19]

Gudin et al.

[11] 3,816,960

[45] June 18, 1974

[54] METHOD FOR GROWING PLANTS

[75] Inventors: Claude Gudin, London; Eric Peel, Twickenham, both of England

[73] Assignee: The British Petroleum Company Limited, London, England

[22] Filed: Mar. 2, 1973

[21] Appl. No.: 337,508

[30] Foreign Application Priority Data

Mar. 13, 1972   Great Britain.................... 11579/72
May 30, 1972   Great Britain.................... 25257/72
May 30, 1972   Great Britain.................... 25258/72

[52] U.S. Cl. .................................................. 47/58
[51] Int. Cl. .......................................... A01g 31/00
[58] Field of Search ........................................ 47/58

[56] References Cited
UNITED STATES PATENTS 3,514,900   6/1970   McDade ............................... 47/58
3,628,287   12/1971   Staba et al. .......................... 47/58
3,683,550   8/1972   Corlett et al. ........................ 47/58
3,704,546   12/1972   Hardy et al. .......................... 47/58

FOREIGN PATENTS OR APPLICATIONS 1,310,119   3/1973   Great Britain

*Primary Examiner*—Robert E. Bagwill

[57]   ABSTRACT

A method of preparing plant tissue having improved photosynthetic ability by growing tissue on a first medium containing sugar, preferably glucose, and transferring tissue sequentially to growth media containing less sugar. The growing preferably takes place under intense light and increased carbon dioxide concentrations. Preferably the osmotic pressure of all the growth media is kept about the same, by the addition of an inert substance e.g. a sugar alcohol to the growth media in an amount sufficient to compensate for the reduction in osmotic pressure caused by the lower sugar content.

16 Claims, No Drawings

METHOD FOR GROWING PLANTS

This invention relates to a method of preparing strains of plant tissue.

It is known to grow plant tissue by cultivation of a callus of tissue on a growth medium containing a sugar and nutrients. Under controlled conditions the tissue grows by cell division to form more tissue without differentiation of the tissue taking place.

We have now discovered a method of producing a modified strain of plant tissue which can be grown on a growth medium having a reduced sugar content, the tissue having an increased carbon dioxide adsorption.

In this application by plant tissue is meant tissue from Spermatophyta.

According to the invention there is provided a method of producing a modified strain of plant tissue which comprises growing undifferentiated plant tissue on a first growth medium containing a sugar in the presence of light and carbon dioxide, removing part of the growing tissue and transferring the part to a second growth medium containing less sugar.

The method of the invention can be repeated progressively by transferring part of the plant tissue to a further growth medium containing less sugar.

The second growth medium preferably has added thereto sufficient of non-toxic, non-utilisable substance to maintain the osmotic pressure of the second growth medium substantially the same as the first growth medium.

The preferred substances used to maintain the osmotic pressure of the growth medium are organic compounds, such as sorbitol and mannitol and other sugar alcohols. Inorganic substances can also be used provided they have no harmful effects on the plant tissue.

The amount of substance to be added at any stage can be calculated by working out the initial osmotic pressure from the initial molar sugar concentration and hence calculating the amount of the substance to be added to substantially maintain the osmotic pressure. An advantage of using a sugar alcohol is that, as its molecular weight is near that of the sugar, the weight concentration of sugar plus sugar alcohol can be maintained substantially constant, the reduction in sugar being compensated for by increase in sugar alcohol.

The growth of plant tissue in vitro in liquid shake cultures or on agar media is a technique which has been used for growth of many types of plant. A technique is described in the American Journal of Botany, 1963, Vol 50, pages 248–54, in an article by A. C. Hildebrandt, J. C. Wilmar, H. Johns, and A. J. Riker.

Basically the technique involves taking a callus from part of an aseptic plant, transferring it to a growth medium and exposing the tissue to light. The tissue will grow on the growth medium. The technique can also be used to grow plant cells in suspension in a liquid nutrient medium.

There are many well known nutrient media which have been used for plant cell tissue culture. They usually contain various minerals needed as nutrients, sometimes called macro-elements, and various metal salts, sometimes called micro-elements, also various amino acids, vitamins and plant growth regulators can be present. Examples of common nutrient media which have been used are Skoog, Heller, Knop, Skoog and Murashige, Gamborg, White and Street media. These media contain various amounts of the various ingredients. As a source of sugar, sucrose, glucose and coconut milk have been used.

Typical macro-elements include nitrogen, phosphorus, potassium, calcium, and magnesium; typical micro-elements include iron, zinc manganese, copper, nickel, molybdenum and boron.

Concentrations of sugar useful in the first growth medium in our invention are from 2–5 percent wt. vol i.e. 20–50 grms/litre, preferably of approximately 30 grms/litre. The preferred sugar to be used is glucose.

The media also contain plant growth regulators such as auxins and cytokinins, and amino acids and vitamins such as Nicotinic Acid, Thiamine, glycine and Folic Acid.

Preferably there is an increased light intensity during the growth of the plant tissue, for example light intensities of 2,500 – 10,000 lux e.g. of about 7,000 lux can be used, and during the first stage of growth the more intense light is used e.g. intensities of 5,500 to 10,000 lux.

During growth of the plant tissue the concentration of carbon dioxide in the atmosphere is preferably increased to greater than that of normal atmosphere (0.03–0.5 percent vol/vol).

The concentration of carbon dioxide can be increased by covering the mouth of the vessel in which the tissue is growing with a membrane semi-permeable to carbon dioxide. Respiration during darkness will increase the carbon dioxide content of the atmosphere in the vessel. If higher concentrations of carbon dioxide are required the vessel can be sealed and the partial pressure of carbon dioxide increased within the vessel.

The plant tissue growing on the first growth medium will absorb some carbon dioxide from the air and adsorb light to enable photosynthesis to take place, using the chloroplasts present in the tissue. The efficiency of the photosynthetic ability of the tissue can be determined by the carbon dioxide adsorption of the tissue. A measure of the relative photosynthetic abilities of different parts of the growing tissue can be obtained by visual inspection of the growing tissue, the greener portions containing more active chloroplasts.

Preferably the greener portion is transferred to the second growth medium.

By repeating the process of transferring part of the plant to growth media containing less sugar, it is possible to increase the photosynthetic ability of the plant tissue.

The growing plant tissue then obtains more of the carbon it needs for growth from carbon dioxide in the air, and less from the sugar.

The tissue can be grown aseptically on agar in any suitable vessel which is transparent to light. Preferably glass vessels are used because of their inertness and easy sterilisation. The vessel should be kept covered during tissue growth to minimise the risk of bacterial contamination.

It is a feature of the invention that it can produce a photosynthetic strain of some tissues i.e., tissue which can obtain all its carbohydrate requirements from carbon dioxide and be grown on a sugar-free medium.

Plant tissues which can be cultivated this way include the tissues of grasses such as lucerne, clover, vegetables such as carrot, and plants such as tobacco.

The invention will now be described with reference to the following Examples.

EXAMPLE 1

Callus from the plant Psoralea bituminosa was grown in tubes on Skoog medium containing 3 percent by weight sucrose (30 g/litre). The mouths of the tubes were sealed with a high density polyethylene film. The tissue was grown under long day conditions (16 h light) in a light intensity of 7,000 lux under colour blended Mercury Tungsten Ballast lamps. The tissue was allowed to grow for a period before the greenest parts of the tissue were selected and transplanted onto fresh medium. This process of growth and selection was repeated over a 6 months period, the rates of respriation and photosynthesis of callus at each stage of selection being measured by infra-red gas analysis (for $CO_2$ rates) and the oxygen electrode (for $O_2$) rates.

The Skoog medium is as described in Example 2.

TABLE 1

| Status of Psoralea Callus | Photosynthetic Rate* ($\mu$mol $CO_2$ fixed/g dry wt/h) |
|---|---|
| Initial light green | <1 |
| Medium green | 16 |
| Very green | 38 |
| After 16 months selection | 78 |
| With neo-formations | 119 |

After obtaining dark green callus by this process, the sucrose concentration in the medium was reduced.

TABLE 2

| Medium Sucrose Concentration | Photosynthetic Rate* ($\mu$mol $O_2$ evolved/g fresh wt/h) | Photosynthetic Rate/Respriation Rate |
|---|---|---|
| 30 g/liter | 2.5 | 0.3 |
| 3.75 g/liter | 2.8 | 0.7 |

*Each $\mu$mol of $CO_2$ fixed liberates a $\mu$mole of $O_2$.

As can be seen, the invention enables tissue to be cultivated on a medium having reduced sugar content.

EXAMPLE 2

Callus from the plant Psoralea bituminosa was grown in tubes on Skoog medium containing 3 percent by weight sucrose (30 g/litre). The mouths of the tubes were sealed with a high density polyethylene film. The tissue was grown under long day conditions (16 h light) in a light intensity of 7,000 lux under colour blended Mercury Tungsten Ballast lamps. The tissue was allowed to grow for a period before the greenest parts of the tissue were selected and transplanted onto fresh medium. Using the same medium containing glucose and by visual inspection it was found that the number of chloroplasts per plant cell had increased from 6–8 for the tissue grown on sucrose to 14–18 for the tissue grown on glucose.

This process using glucose was repeated using amounts of glucose and the rates of respriation measured using infra-red gas analysis (for $CO_2$ rates) and the oxygen electrode (for $O_2$ rates).

The Skoog medium has a composition:

| Macroelements (g/l) | | Macroelements (mg/l) | |
|---|---|---|---|
| $KNO_3$ | 1.900 | $H_3BO_3$ | 10.000 |
| $MgSO_4.7H_2O$ | 0.370 | $MnSO_4.4H_2O$ | 25.000 |
| $CaCl_2.2H_2O$ | 0.440 | $CuSO_4.5H_2O$ | 0.025 |
| $KH_2PO_4$ | 0.170 | $Na_2MoO_4.2H_2O$ | 0.250 |
| $NH_4NO_3$ | 1.650 | $Na_2EDTA$ | 0.027 |
| | | $FeSO_4.7H_2O$ | 0.037 |

| Aminoacids and Vitamins (mg/l) | | Plant Growth Regulation (mg/l) |
|---|---|---|
| Nicotinic Acid | 0.005 | Naphthyl Acetic Acid $3\times10^{-4}$ |
| Meso-inositol | 0.100 | Kinetin $2\times10^{-4}$ |
| Pyrodoxine HCl | $5\times10^{-4}$ | |
| Thiamine HCl | $5\times10^{-4}$ | |
| Biotin | $5\times10^{-5}$ | |
| Folic Acid | $5\times10^{-4}$ | |
| Glycine | 0.002 | |
| Glutamine | 0.200 | |

The results are shown in Table 3 below. The $CO_2$ fixed being equivalent to oxygen liberated.

TABLE 3

| Medium | Infrared gas analysis[1] | | | Oxygen electrode[2] | | |
|---|---|---|---|---|---|---|
| | P' | R' | P'/R' | P² | R² | P²/R² |
| Normal Skoog | 4.81 | 8.36 | 0.58 | 7.30 | 8.80 | 0.83 |
| Skoog plus 30 g./l. glucose | 2.53 | 8.57 | 0.29 | 2.45 | 4.55 | 0.54 |
| Skoog plus 20 g./l. glucose | 2.61 | 5.74 | 0.45 | 3.25 | 9.25 | 0.35 |
| Skoog plus 10 g./l. glucose | 3.21 | 6.42 | 0.50 | 6.65 | 10.65 | 0.66 |
| Skoog plus 5 g./l. glucose | 3.24 | 10.52 | 0.31 | 4.85 | 6.65 | 0.73 |
| Skoog plus 1 g./l. glucose | 3.39 | 2.26 | 1.50 | 4.90 | 5.25 | 0.93 |
| Skoog plus 0 g./l. glucose plus 1% $CO_2$ | 1.81 | 1.81 | 1.00 | 4.20 | 4.60 | 0.91 |

P = Photosynthesis     R = Respriation 1. figures represent $\gamma$ moles $CO_2/g$ fresh wt/h
2. figures represent $\gamma$ moles $O_2/g$ fresh wt/h The results on a dry weight basis at the oxygen electrode are shown in Table 4.

TABLE 4

| Medium Glucose Cont (g/l) | Rate of Photosynthesis P ($\mu$moles $O_2/g$ dry wt/h) | Rate of Respriation R ($\mu$moles $O_2/g$ dry wt/h) | P/R |
|---|---|---|---|
| 30 | 52.5 | 111 | 0.54 |
| 20 | 40.5 | 115 | 0.35 |
| 10 | 93.0 | 168 | 0.66 |
| 5 | 227.0 | 311 | 0.73 |
| 1 | 130.0 | 140 | 0.93 |
| 0+1% $CO_2$ | 69.0 | 75 | 0.91 |

EXAMPLE 3

Callus from the plant Psoralea bituminosa was grown in tubes on Skoog medium containing 3 percent by weight glucose (30 g/litre). The mouths of the tubes were sealed with a high density polyethylene film. The tissue was grown under long day conditions (16 h light) in a light intensity of 7,000 lux under colour blended Mercury Tungsten Ballast lamps. The tissue was allowed to grow for a period before the greenest parts of the tissue were selected and transplanted onto fresh medium containing less glucose but sufficient sorbitol to maintain glucose plus sorbitol concentration constant. This process was repeated over a period of weeks, and the rates of respiration and photosynthesis of callus at each stage of selection being measured by infra-red gas analysis ($CO_2$ rates) and the oxygen electrode (for $O_2$) rates. The concentration of carbon dioxide was increased to 1 percent vol/vol.

The Skoog medium has a composition:

| Macroelements (g/l) | | Microelements (mg/l) | |
|---|---|---|---|
| $KNO_3$ | 1.900 | $H_3BO_3$ | 10.000 |
| $MgSO_4.7H_2O$ | 0.370 | $MnSO_4.4H_2O$ | 25.000 |
| $CaCl_2.2H_2O$ | 0.440 | $CuSO_4.5H_2O$ | 0.025 |
| $KH_2PO_4$ | 0.170 | $Na_2MoO_4.2H_2O$ | 0.250 |
| $NH_4NO_3$ | 1.650 | $Na_2EDTA$ | 0.027 |
| | | $FeSO_4.7H_2O$ | 0.037 |

| Aminoacids and Vitamins (mg/l) | | Plant Growth Regulation (mg/l) | |
|---|---|---|---|
| Nicotinic Acid | 0.005 | Naphthyl Acetic Acid | $3 \times 10^{-1}$ |
| Meso-inositol | 0.100 | Kinetin | $2 \times 10^{-1}$ |
| Pyridoxine HCl | $5 \times 10^{-4}$ | | |
| Thiamine HCl | $5 \times 10^{-4}$ | | |
| Biotin | $5 \times 10^{-5}$ | | |
| Folic Acid | $5 \times 10^{-4}$ | | |
| Glycine | 0.002 | | |
| Glutamine | 0.200 | | |

The results are shown in the Table below. The $CO_2$ fixed being equivalent to oxygen liberated.

TABLE 5

| G/litre Glucose | G/litre Sorbitol | R* $\mu$mol. $O_2$/grm dry wt. per hour | P* $\mu$mol. $O^2$/g dry wt. per hour | P/R |
|---|---|---|---|---|
| 30 | 0 | 111 | 52.5 | 0.54 |
| 20 | 10 | 115 | 40.5 | 0.35 |
| 10 | 20 | 168 | 93.0 | 0.66 |
| 5 | 15 | 311 | 227 | 0.73 |
| 1 | 29 | 140 | 130 | 0.93 |
| 0 | 30 | 77.6 | 77.6 | 1.00 |
| | | 47.5 | 47.5 | 1.00 |

*Measured at 16,500 lux.

It can be seen that the process of the invention enables a photosynthic strain of plant to be produced.

We claim:

1. A process for producing modified plant tissue from unmodified plant tissue by growing undifferentiated plant tissue on a first growth medium containing a sugar, in the presence of light and carbon dioxide, then removing part of the growing tissue and transferring the part removed to a second growth medium containing less sugar, and growing the transferred part on the second growth medium to produce modified plant tissue.

2. A process as claimed in claim 1 in which there is added to the second growth medium sufficient of a non-toxic, non-utilisable substance to maintain the osmotic pressure of the second growth medium substantially the same as the first growth medium.

3. A process as claimed in claim 2 in which the non-toxic, non-utilisable substance is a sugar alcohol.

4. A process as claimed in claim 2 in which the concentration of sugar in the first growth medium is 2 to 5 percent wt/vol.

5. A process as claimed in claim 1 in which the sugar is glucose.

6. A process as claimed in claim 1 in which the light intensity during the growth of the tissue is from 2,600 to 10,000 lux.

7. A process as claimed in claim 6 in which the light intensity during the growth of the tissue is from 5,500 to 10,000 lux.

8. A process as claimed in claim 1 in which the concentration of carbon dioxide in the atmosphere in which the tissue is growing is increased during growth.

9. A process as claimed in claim 8 in which the tissue is grown in a vessel, the mouth of which is covered by a membrane semi-permeable to carbon dioxide.

10. A process as claimed in claim 8 in which the tissue is grown in a vessel, the mouth of the vessel is sealed and the partial pressure of carbon dioxide within the vessel is increased.

11. A process for producing modified plant tissue from unmodified plant tissue in which process there are a plurality of growth media containing sequentially lower concentrations of a sugar, unmodified plant tissue is grown on the first growth medium containing a high concentration of sugar, and part of the growing tissue is sequentially transferred to growth media of lower sugar content, where it grows, and the light intensity during growth being from 2,600 to 10,000 lux and the carbon dioxide concentration in the atmosphere in which the tissue is grown is increased.

12. A process as claimed in claim 11 in which the growth medium containing the lowest concentration of sugar contains substantially no sugar.

13. A process as claimed in claim 11 in which the part of the growing tissue transferred is greener than the part remaining.

14. A process as claimed in claim 11 in which the sugar is glucose.

15. A process as claimed in claim 11 in which the osmotic pressure of all the growth media is maintained substantially constant by the addition thereto of sufficient a non-toxic non-utilisable substance to the growth media containing lower concentrations of sugar.

16. A process as claimed in claim 11 in which the concentration of sugar in the first growth medium is from 2 – 5 percent wt/vol.

* * * * *